June 20, 1967 T. L. A. M. STEENHUIS 3,325,898
FEEDING PLASTIC SUBSTANCES
Filed Feb. 10, 1965 8 Sheets-Sheet 5

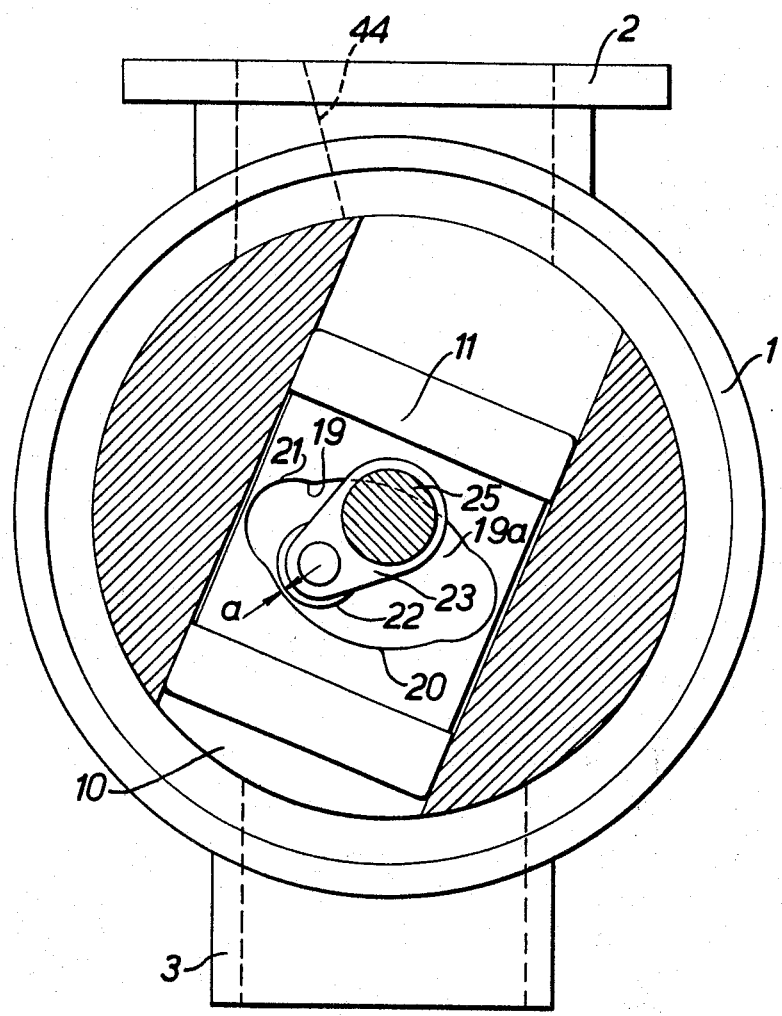

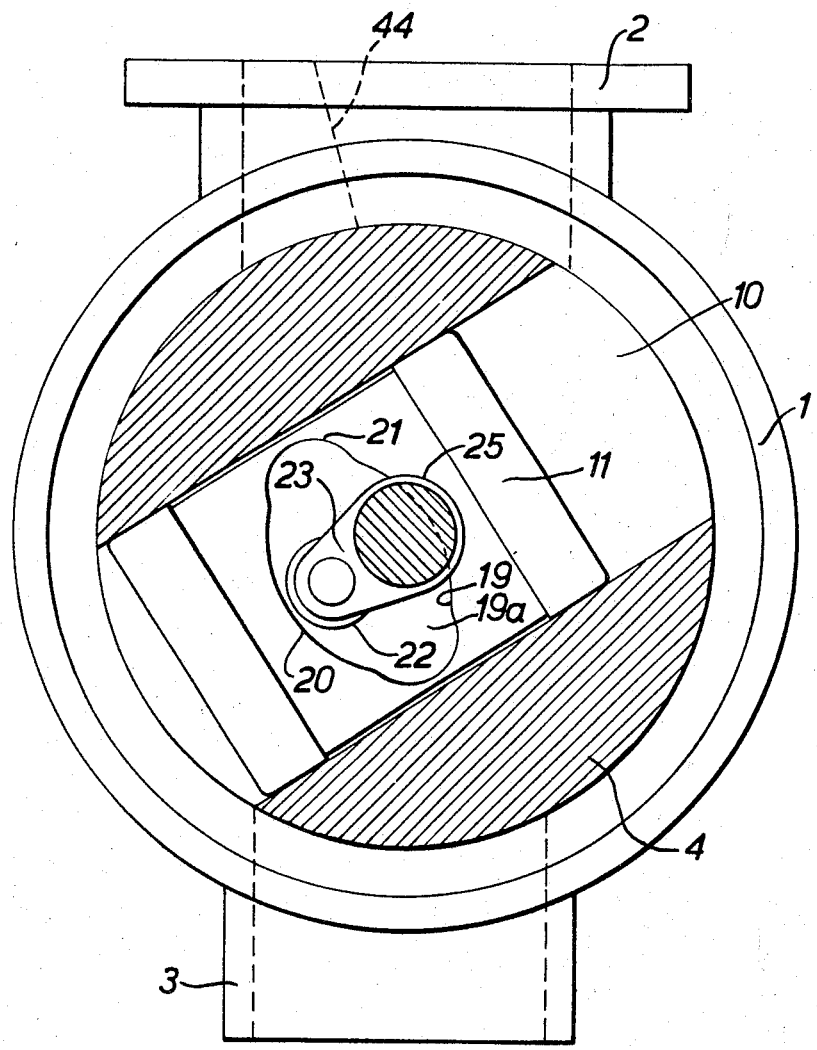

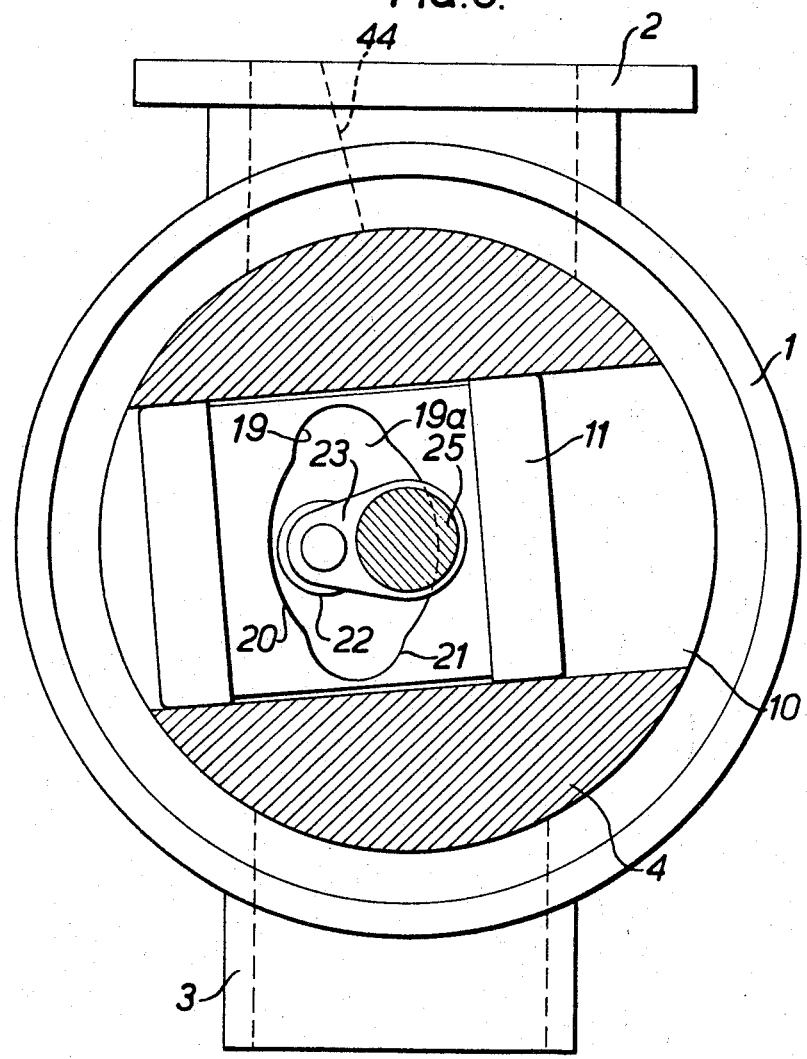

United States Patent Office 3,325,898
Patented June 20, 1967

3,325,898
FEEDING PLASTIC SUBSTANCES
Theodor Ludwig August Maria Steenhuis, Cleves, Germany, assignor to Lever Brothers Company, New York, N.Y., a corporation of Maine
Filed Feb. 10, 1965, Ser. No. 431,663
Claims priority, application Germany, Feb. 14, 1964, U 10,498
6 Claims. (Cl. 31—10)

The invention relates to feeding, in dosed and partly shaped quantities, viscous or soft plastic substances, such as margarine, butter, etc., by means of a device comprising a casing having an inlet and an outlet which are diametrically opposed and a channel member rotatably mounted in the casing and having a channel perpendicular to the axis of rotation, which channel during each half revolution of the channel member is brought in communication with the inlet and the outlet and in which a measuring piston having a variable stroke is moved positively and also by means of the pressure at which the substance to be measured off is supplied.

Measuring devices of the type mentioned have previously been suggested in which the measuring piston, when the channel member has reached a certain position in the casing, is driven mechanically by means of a periodically moved control arm. This control arm acts via a slidable push-rod on a control lever pivotally mounted in the casing and extending with its end in a recess of the piston.

Because a distinct feed pressure is desirable and required, the substance to be measured off is usually fed to the inlet under pressure and enters the channel in the channel member also under pressure. However, in practice it appears that fluctuations in pressure between wide limits can occur, in which the nature of the substance to be measured off has, as will be appreciated, a rather determining function. Consequently, with the previously suggested device an exact timing of the completion of the stroke of the measuring piston cannot be obtained when the pressure of the substance to be measured off and fed to the inlet exceeds a given value, because too high a pressure causes the piston to lead, resulting in that the quantity of substance measured off leaves the outlet too early.

Also, the previously suggested device is subjected to vibrations during operation owing to the inertia of its moving parts and the accelerations and decelerations imparted thereto.

It is an object of the present invention to provide an improvement on the previously suggested device. According to the invention the movement of the piston is arrested until a distinct overlapping between the inlet and outlet and the channel in the channel member is effected, after which the piston is first positively driven over a part of its stroke, whereafter the piston is released to allow it to complete its stroke under the influence of the filling pressure of the substance to be measured off.

According to the invention the movement of the piston is preferably controlled by means of a control track and a control roller riding therein. One of these elements is connected with the piston and the other is arranged on the casing, the latter element preferably being moved during the stroke of the piston in a direction opposite to the direction in which the channel member revolves.

According to a preferred embodiment of the device of the invention the control roller is carried by an axle fixed eccentrically to a shaft journalled in the casing and co-axial with the axis of the channel member, which shaft is arranged to start rotating in a direction opposite to the direction in which the channel member revolves when the distinct overlapping between the inlet and the outlet and the channel of the channel member has been established. In the period in which the communication between the channel of the channel member and the inlet and outlet is interrupted, the shaft to which the axle carrying the roller is fixed turns back to its starting position. During the latter motion the control roller is free of the control track. Consequently, the control roller journalled on the eccentric axle carries out a reciprocating swinging motion during the forward and backward rotation of the shaft.

The control track is preferably constituted by the walls of a recess arranged in the side of the measuring piston. In this case the end of the co-axial shaft to which the axle carrying the control roller is eccentrically fixed extends in a lateral recessed part of the piston, of which recessed part the bottom is provided with the recess having the walls which constitute the control track.

The control track preferably has the shape of a kidney which is symmetric with respect to the main axis of the piston as well as to its cross axis, the main axis of the control track being perpendicular to the main axis of the piston. The control track is composed of two identical arcs of a circle opposite to each other in the direction of the main axis of the piston and of two further arcs of a circle, which are likewise identical and which link up with the former arcs, the latter arcs having, however, a smaller radius and being opposite to each other in the direction of the cross axis of the piston. The diameter of the arcs of the circle with the smaller radius corresponds with the diameter of the control roller.

The device of the invention may be provided with known means for adjusting the stroke of the piston. This means may, e.g., comprise an adjusting spindle arranged co-axially with the axis of the channel member and having a conical end to which identically tapered thrust surfaces of the measuring piston abut in turn. In case such adjusting means have been provided the shaft driving the eccentric axle carrying the control roller is arranged on the opposite side of the casing.

The invention will now be described with reference to the accompanying drawing, in which:

FIGS. 3-8 show sections along the line V—V of FIG. 2 illustrating the movement of the channel member with the corresponding positions of the measuring piston.

Figure 1:
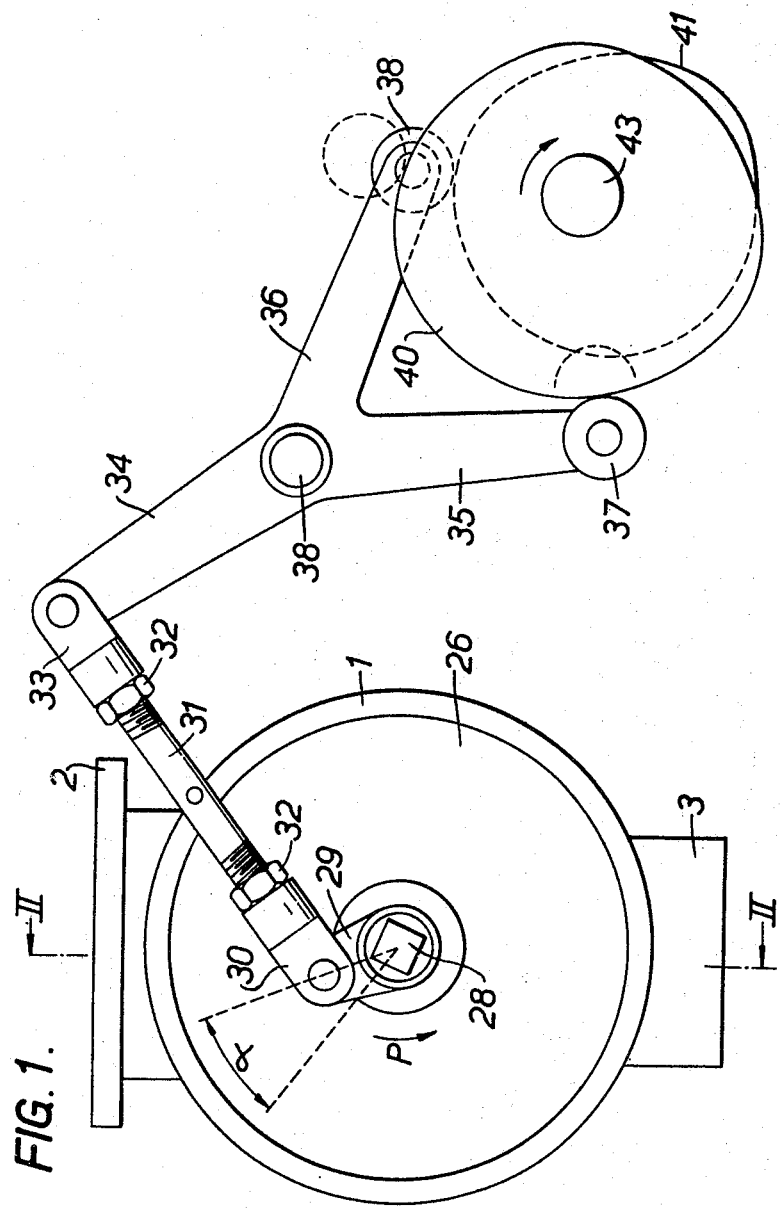
FIG. 1 shows a front view of the device with the driving means of the control means.
Figure 2:
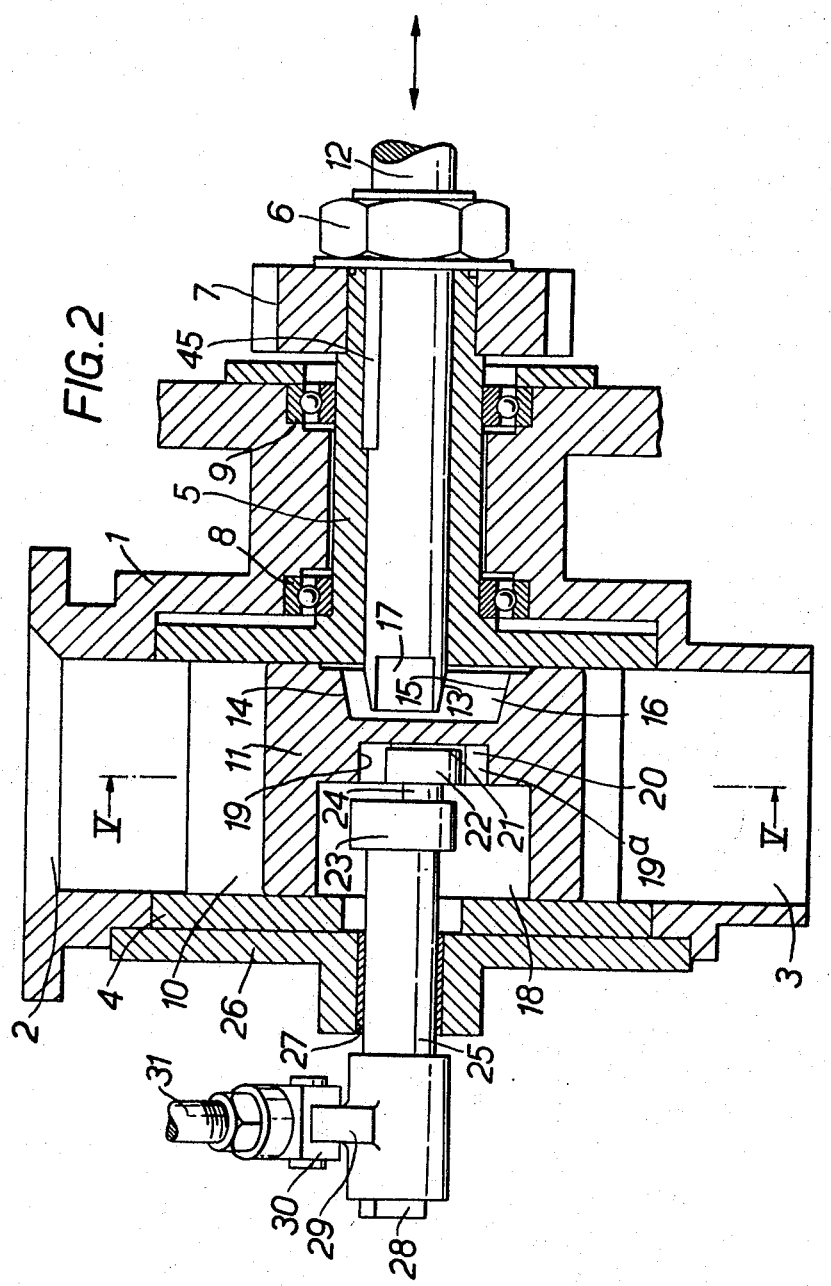
FIG. 2 shows a section along line II—II of FIG. 1 in which the measuring piston is in the position shown in FIG. 5.

The stationary casing of the device indicated with reference numeral 1 comprises an inlet 2 and an outlet 3 opposite thereto. The substance to be measured off is fed to the inlet 2 under pressure and a coresponding quantity of substance leaves the outlet 3 after each measuring off operation. On measuring off a plastic substance the quantities of substance measured off leave the outlet 3 in the form of a continuous bar from which pieces coresponding to the quantities measured off are severed periodically by means of a cutting device (not shown). The cutting operation is synchronized with the operation of the measuring device by known means.

In the casing 1 is journalled a continuously rotating hollow shaft 5 which forms a single piece with the cylindrical channel member 4. By means of a nut 6 a gear wheel 7 meshing with the drive (not shown) of the device is fixed on the extreme end of shaft 5. The hollow shaft 5 is journalled in casing 1 by means of roller bearings 8 and 9.

The channel member 4 is provided with a channel 10 which is perpendicular to the axis of rotation of the channel member and which on each half revolution of the channel member 4 comes in communication with the inlet 2 and with the outlet 3. A measuring piston 11 is slidably fitted in channel 10, which piston every time carries out one stroke in the period in which the channel 10 is in communication with the inlet 2 and the outlet 3 so as to eject a quantity of substance from the channel 10 of the channel member into the outlet 3. During this ejection a corresponding quantity of substance enters into the channel of the channel member at the same time at the other end of the piston.

To limit the stroke of the piston in order to effect an exact measuring off operation an adjusting means, known per se, is provided. This comprises an adjusting spindle 12 in the hollow shaft 5 of the channel member 4 and adjustable in axial direction. The spindle 12 is provided with a conical end 13 which co-operates with correspondingly tapered thrust surfaces 14 and 15 of the piston 11. The tapered surfaces 14 and 15 are arranged at the ends of a slit-shaped recess 16 of the piston 11. Reference numeral 17 indicates two opposite flattened portions of the conical end 13 of the adjusting spindle 12, the distance between the flattened portions 17 corresponding with the width of the recess 16. These flattened portions 17 prevent the piston 11 from turning around its axis. With the described embodiment of the adjusting means the adjusting spindle 12 rotates together with the channel member 4 because of the key 45 between these parts.

At the side of the piston 11 opposite the slit 16 a recessed part 18 is provided, in the bottom of which a recess 19a is arranged. The walls of the recess 19a constitute a control track 19.

As shown in FIGURES 3–8 the control track 19 has the shape of a kidney. The main axis of this control track is perpendicular to the longitudinal axis of the piston, the control track 19 being symemtrical relative to the longitudinal axis of the piston, as well as relative to its cross axis. The control track 19 is composed of two arcs 20 of a circle which are opposite to each other in the direction of the longitudinal axis of the piston and of two similar arcs 21 of a circle which are symmetrically linked up to the arcs 20 but are of smaller radius.

In the recess 19a a control roller 22 having a radius equal to the radius of the arcs 21 of a circle is arranged, which roller is rotatably journalled on an axle 24 at the end of a control lever 23. The other end of the control lever 23 is attached to a shaft 25 which is co-axial with the axis of rotation of the channel member 4 and which protrudes from the casing 1 of the device. The casing 1 is closed by a cover 26 having a journal 27 for the shaft 25.

The end of the shaft 25 outside the casing 1 is provided with a square portion 28 on which an outer control lever 29 is fitted. To lever 29 is linked a fork 30 in which a rod 31 is fitted with the aid of counter nuts 32 which allow adjustment in the longitudinal direction. The other end of the rod 31 having left-hand and right-hand screw threads is fitted in a second fork 33 which is linked to an arm 34 of a crank having three arms 34, 35 and 36. This crank 34, 35 and 36 is journalled on a stationary shaft 38 which is preferably connected to the casing 1. Each of the arms 35 and 36 of the crank 34, 35, 36 is provided with a pivotally mounted roller 37, 38 respectively, which rollers ride over cams 40, 41 respectively. These cams 40 and 41 are keyed on a shaft 43 revolving at a speed twice the speed at which the channel member 4 revolves and move the arms 35 and 36 from the position shown with full lines to the position shown with broken lines in the period of time in which the channel 10 of the channel member is in communication with the inlet 2 and the outlet 3. In the period of time in which the communication between the channel 10 of the channel member and the inlet 2 and outlet 3 is interrupted the cams 40 and 41 move the arms 35 and 36 back to the starting position shown with full lines. Thus, the control shaft 25 is periodically reciprocated over a distinct angle around the axis of rotation of the channel member 4 resulting in that the control roller 22 moves along an arc of a circle.

Figure 3:
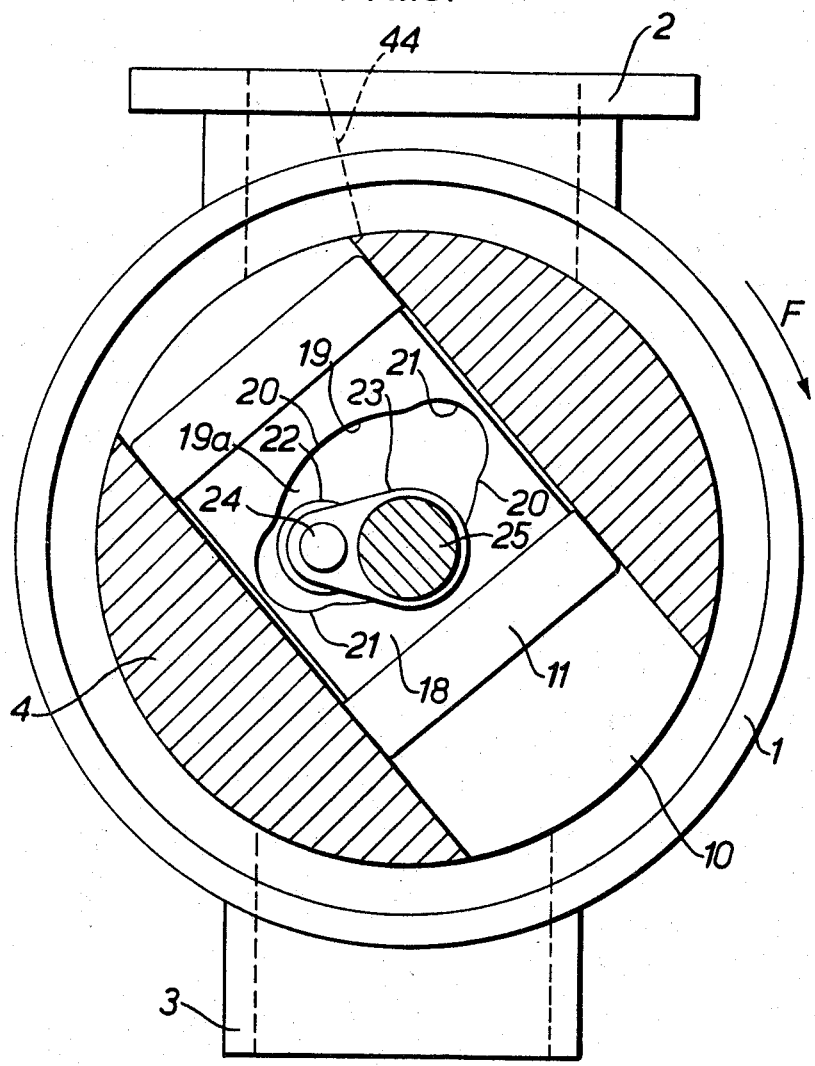

The mode of operation is as follows:

It is assumed that the starting point is the position of the channel member 4 shown in FIG. 3. Though a communication between the inlet 2 and the channel 10 of the channel member already exists at this position of the channel member 4 determined by the co-operation of the conical surfaces 13 and 15, the piston 11 should not yet commence its stroke. This may be the result of too low a filling pressure of the substance to be measured off. But when the filling pressure is so high that the piston 11 on reaching the position of the channel member 4 shown in FIG. 3 would start its stroke under the influence of the filling pressure of the substance to be measured off, the inlet orifice may be decreased as shown in FIGS. 3–8 by broken line 44.

Figure 4:
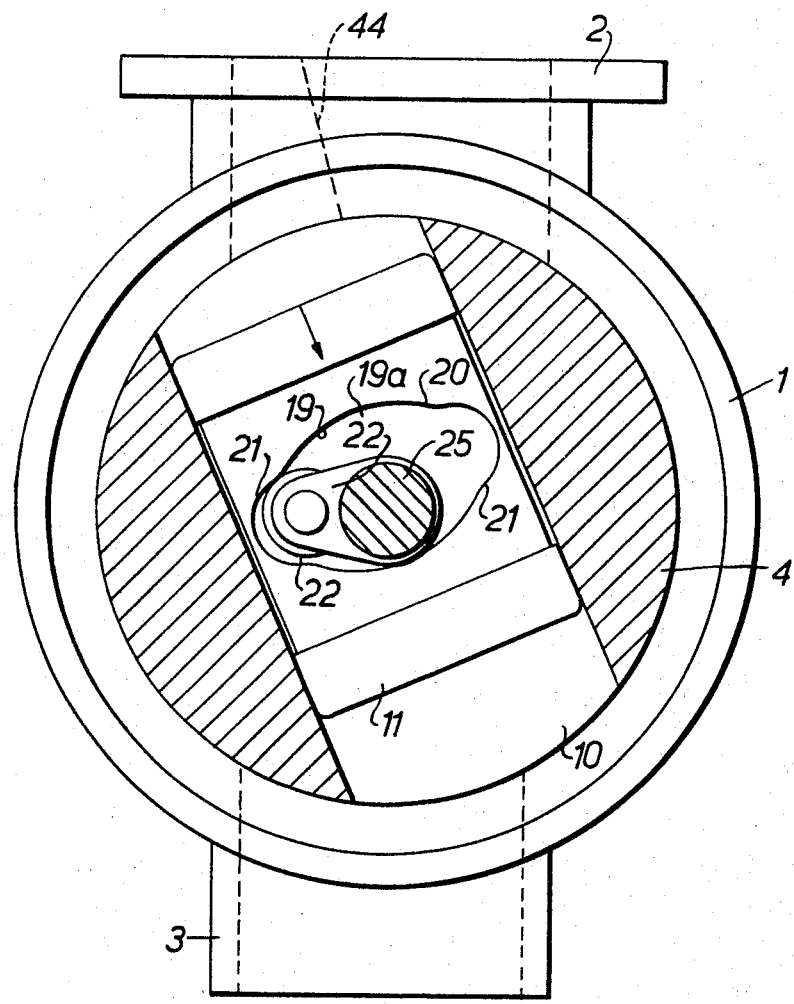
Figure 5:
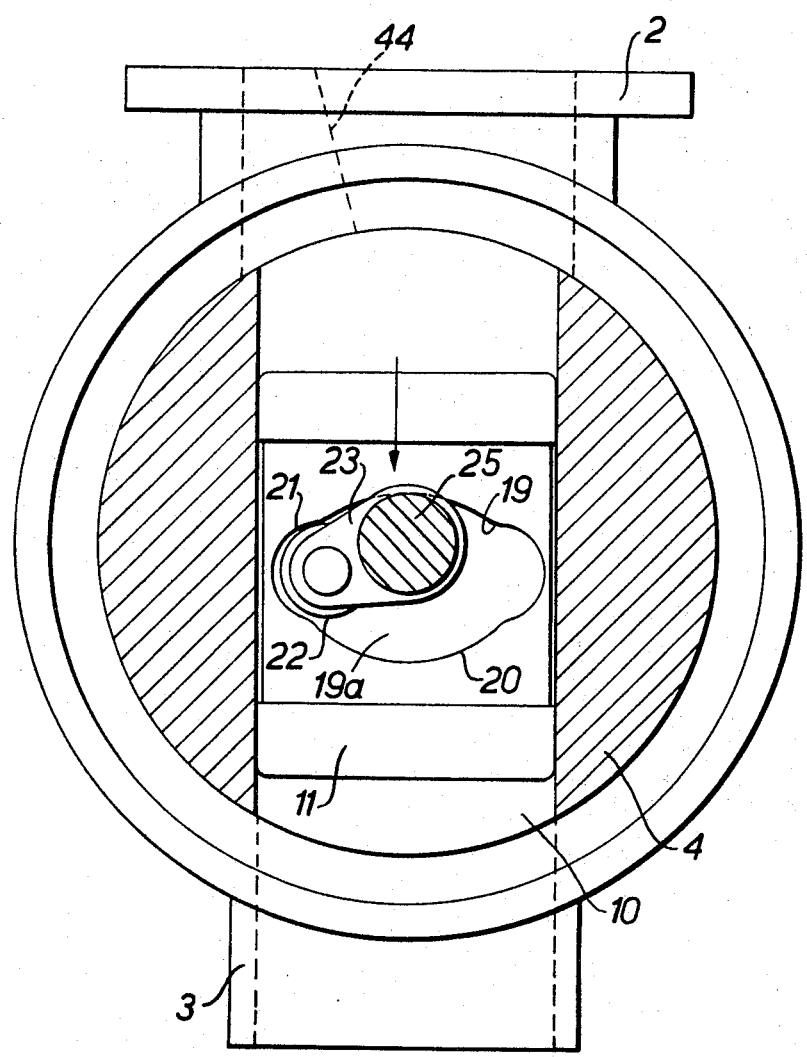

When the channel member 4 rotates further in the direction indicated by the arrow F in FIG. 3 the control roller 22 owing to the shape of the cams 40 and 41 will still be kept in the position shown in FIGURES 3 and 4. At this position of the roller it is not in contact with the control track 19 constituted by the walls of the recess 19a until the channel member 4 has almost reached the position shown in FIG. 4. At the position of the channel member at which the control roller 22 contacts the control track 19 the roller serves as a stop for the piston 11 and prevents the piston from starting its stroke before the channel member 4 has reached the position shown in FIG. 4. Inasmuch as the piston 11 should not begin its stroke until the channel member 4 has reached the position shown in FIG. 4, the shape of the cam 40 is determined correspondingly, so that the shaft 25 only at that moment starts to rotate in the direction indicated by the arrow P in FIG. 1. The motion of the piston 11 is effected either by the filling pressure of the substance to be measured off or in a positive manner by the control roller 22. Another possibility is that both driving forces influence the piston 11 simultaneously. With the position of channel member 4 shown in FIG. 5 it is assumed that the piston is driven only by the filling pressure of the substance to be measured off, so that the control roller 22 during the rotation of the channel member 4 from the position shown in FIG. 4 to the position shown in FIG. 5 may contact only the side of the arc 21 of the circle of the control track 19 adjacent the inlet and thus does not drive the piston but only controls its motion in a positive manner. When the channel member 4 has reached the position shown in FIG. 5 the control lever 23 fixed to the shaft 25 has been rotated by said shaft so far that the control roller 22 fixed to the lever has then just attained the centre of its stroke. When the channel member 4 rotates further the control roller 22 engages in a positive manner the recess constituted by the arc 21 of a circle of the control track 19 and drives the piston 11 further in the direction of the outlet until the position of the channel member, shown in FIG. 6, has about been reached. When the control roller 22 has completed its swinging motion the contact between the control track 19 and the control roller 22 is interrupted and the piston 11 continues to move further under the influence of the filling pressure of the substance to be measured off and of the centrifugal force until it has reached its end position shown in FIG. 6 determined by the thrust surfaces 13 and 14.

During the rotation of the channel member 4 from the position shown in FIG. 6 to the position shown in FIG. 7 the control roller 22 remains stationary owing to the shape of the cam 41.

The radius of the arc 20 of a circle of the control track 19 has been chosen such that this arc remains free of the control roller 22. Consequently, relative to the channel member 4 the piston 11 remains in the position shown in FIG. 6, until the channel member 4 has returned to the position shown in FIG. 3 via the positions shown in FIGS. 7 and 8.

During the rotation of the channel member from the position shown in FIG. 7 to the position shown in FIG. 3 the control lever 23 and, consequently, also the control roller 22 are returned to the starting position (FIG. 3). During this return motion the control roller 22 has its swinging motion completed halfway when the channel member 4 has reached the position shown in FIG. 8. During its return motion the control roller 22 remains free of the control track 19.

The instant the channel member 4 has reached again the position shown in FIG. 3 the cycle described starts anew. The channel member 4 then has completed half a revolution and the shaft 43 with the cams 40 and 41 has completed a complete revolution.

When the means for adjusting the stroke of the piston has been adjusted such that the piston executes its longest possible stroke, the piston still has to cover a certain play for reaching the end of its stroke after the positive control of its motion by the control roller 22 has ceased, which play is indicated in FIG. 6 by reference character $a$. If the filling pressure of the substance to be measured off is too low for the piston to cover the distance $a$ it can be assisted by a further mechanical drive. However, in case the stroke of the piston has been adjusted to a smaller limit, which limit is at a minimum when $a=0$, the further mechanical drive of the piston must act in a resilient manner in order to prevent fracture of the material.

A friction clutch, for instance, can be inserted in the further mechanical drive of the pistons for effecting a resilient operation. In case the function of the further drive of the piston 11 is to be taken over by the control roller 22 in the embodiment shown the arm 34 of the crank 34, 35 and 36 may be resilient of the connection rod 31 may be resilient in a telescopic manner.

Owing to the small inertia of the parts in motion the device of the invention not only allows a high speed of operation, but on account of the exact timing of the piston stroke relative to the rotation of the channel member 4 makes it possible that discharge from the outlet of the substance measured off commences only when the channel 10 overlaps the outlet 3 substantially completely, which accounts for the possibility to eject the substance measured off from the channel into the outlet in a direction which is substantially parallel with a line connecting the inlet and outlet. Further, by the positive engagement of the control roller 22 in the lateral recesses of the control track 19 constituted by the arcs 21 of the circle, and by the resulting positive drive of the piston a sucking action of the device on the substance fed to it can eventually be exercised, which sucking action, in addition to the filling pressure warrants a reliable filling of the measuring chamber and, consequently, a high degree of exactness of the quantities measured off.

What is claimed is:

1. An apparatus for feeding plastic substances comprising; a casing having an inlet and an outlet which are diametrically opposed; a channel member mounted for continuous rotation in said casing and provided with a channel perpendicular to the axis of rotation, which channel of the channel member can be aligned with the inlet and outlet; a measuring piston reciprocally located within said channel for movement under at least the partial influence of the filling pressure at the inlet when an end of the channel is aligned with the outlet; and drive means operatively associated with the channel member to cause rotation of said channel member and the piston; and piston control means for arresting reciprocal stroke movement of said piston within the channel until a distinct alignment among the inlet and the outlet of the casing and the channel is effected, and for thereafter positively driving the piston over a part of its reciprocal stroke and then releasing the piston for completion of its stroke under the influence of the inlet filling pressure of the substance to be measured off.

2. An apparatus according to claim 1 in which the piston control means comprises a control track provided in the piston and a control roller mounted on a shaft and cooperating with the control track to control said movement of the piston.

3. An apparatus according to claim 2 in which the control roller is carried by an axle fixed eccentrically to the shaft and the shaft is journalled in the casing and coaxial with the axis of the channel member, which shaft is arranged to start rotating in a direction opposite to the direction in which the channel member revolves when the distinct alignment between the inlet and the outlet and the channel of the channel member has been established.

4. An apparatus according to claim 2 in which the piston control means includes means for imparting movement to the control roller so that the roller engages the control track and pivots in one direction from a starting position about the axis of the shaft to define the arc of a circle by its movement when the inlet and outlet of the casing are aligned with the channel of the channel member, and disengages the control track and returns to its starting position when the channel is not in alignment with the inlet and outlet of the casing.

5. An apparatus according to claim 2 in which the control track has the shape of a symmetrical kidney whose principal axis is perpendicular to the principal axis of the piston.

6. Apparatus for feeding plastic substances, comprising a casing having an inlet and an outlet which are diametrically opposed, a channel member mounted in the casing for uninterrupted rotation therein and provided with a channel perpendicular to the axis of rotation, means for continuously rotating the channel member, the channel communicating with the inlet and outlet during a portion of each half revolution of the channel member, a measuring piston disposed reciprocally in the channel and having a camming surface, a lever having a control surface eccentrically disposed relative to the axis of rotation of the channel member and cooperating with the camming surface, and means for imparting a reciprocating pivotal motion to the lever during each half revolution of the channel member to arrest movement of the piston within the channel until the channel is in substantial communication with the inlet and outlet and thereafter to positively drive the piston toward the outlet and then release the piston for further movement under the inlet filling pressure of the substance.

References Cited
UNITED STATES PATENTS

| | | | |
|---|---|---|---|
| 1,867,998 | 7/1932 | Benson. | |
| 2,666,229 | 1/1954 | Vogt | 18—21 |
| 2,708,287 | 5/1955 | Long et al. | 17—32 |
| 2,928,173 | 3/1960 | Steenhuis | 31—10 |

SAMUEL KOREN, *Primary Examiner.*

HUGH R. CHAMBLEE, *Examiner.*